United States Patent
Chen et al.

(10) Patent No.: US 12,456,875 B2
(45) Date of Patent: Oct. 28, 2025

(54) CHARGING DEVICE FOR SMALL MEDICAL APPARATUS, AND SMALL MEDICAL APPARATUS

(71) Applicant: BMC MEDICAL CO., LTD., Beijing (CN)

(72) Inventors: Yunjing Chen, Beijing (CN); Zhi Zhuang, Beijing (CN); Qingsong Wang, Beijing (CN)

(73) Assignee: BMC MEDICAL CO., LTD., Beijing (CN)

( * ) Notice: Subject to any disclaimer, the term of this patent is extended or adjusted under 35 U.S.C. 154(b) by 764 days.

(21) Appl. No.: 17/785,435

(22) PCT Filed: Dec. 16, 2020

(86) PCT No.: PCT/CN2020/136745
§ 371 (c)(1),
(2) Date: Jun. 15, 2022

(87) PCT Pub. No.: WO2021/121256
PCT Pub. Date: Jun. 24, 2021

(65) Prior Publication Data
US 2023/0022909 A1    Jan. 26, 2023

(30) Foreign Application Priority Data

Dec. 16, 2019 (CN) .......................... 201911296572.8

(51) Int. Cl.
*H01M 10/46* (2006.01)
*H02J 7/00* (2006.01)

(52) U.S. Cl.
CPC ........ *H02J 7/0044* (2013.01); *H02J 7/00034* (2020.01); *A61B 2560/0214* (2013.01); *A61M 2205/8237* (2013.01)

(58) Field of Classification Search
CPC ...... H02J 7/0034; H02J 7/0044; H02J 7/0042; H02J 2310/23; H02J 50/10; H02J 50/005; A61B 2560/0214
(Continued)

(56) References Cited

U.S. PATENT DOCUMENTS

2009/0163820 A1   6/2009  Eerden
2015/0245668 A1*  9/2015  Memari .................. A24F 40/90
                                                              206/250
(Continued)

FOREIGN PATENT DOCUMENTS

CN    204334029 U    5/2015
CN    206194193 U    5/2017
(Continued)

*Primary Examiner* — Edward Tso
(74) *Attorney, Agent, or Firm* — Bayramoglu Law Offices LLC

(57) ABSTRACT

A charging device for a small medical apparatus and a small medical apparatus are provided. The small medical apparatus includes an apparatus body. A first rechargeable battery and an apparatus charging connector electrically connected to the first rechargeable battery are mounted in the apparatus body. The charging device includes a charging base. A second rechargeable battery is disposed in the charging base. A charging base charging connector and a charging base discharging connector for electrically connecting the apparatus charging connector are disposed at the charging base. The charging base charging connector is electrically connected to a charging terminal of the second rechargeable battery. The charging base discharging connector is electrically connected to a discharging terminal of the second rechargeable battery. The small medical apparatus includes the charging device for the small medical apparatus.

18 Claims, 3 Drawing Sheets

(58) Field of Classification Search
USPC ........ 320/103, 107, 110, 108, 114, 115, 132, 320/148
See application file for complete search history.

(56) References Cited

U.S. PATENT DOCUMENTS

2015/0366538 A1   12/2015   McKenna
2019/0117984 A1   4/2019    Andrews et al.

FOREIGN PATENT DOCUMENTS

| CN | 107769336 A | 3/2018 |
| --- | --- | --- |
| CN | 108011424 A | 5/2018 |
| CN | 110912236 A | 3/2020 |
| CN | 211720277 U | 10/2020 |

\* cited by examiner

CHARGING DEVICE FOR SMALL MEDICAL APPARATUS, AND SMALL MEDICAL APPARATUS

CROSS REFERENCE TO RELEVANT APPLICATIONS

This application is the national phase entry of International Application No. PCT/CN2020/136745, filed on Dec. 16, 2020, which is based upon and claims priority to Chinese Patent Application No. 201911296572.8, filed on Dec. 16, 2019 the entire contents of which are incorporated herein by reference.

TECHNICAL FIELD

The present disclosure relates to the technical field of portable medical instruments, and in particularly relates to a charging device for small medical apparatus, and a small medical apparatus.

BACKGROUND

There are many small medical apparatuses, such as portable ventilators, portable heart rate monitors and sleep monitors, which generally need to use batteries as power supplies due to being not conveniently connected to the charging line all the time during a using state. At present, most of the small medical apparatuses use dry batteries as the power supplies. The power supply life of an AA battery is about 12-14 hours. Taking the sleep monitor as an example, one AA battery may be only enough for one patient to test, and the consumption is large, resulting in an increase in the device using cost. If the dry batteries can be replaced by the rechargeable batteries, a lot of waste may be reduced. At the same time, lots of environmental pollution may also be reduced. At present, the life of the mainstream rechargeable batteries in the market can reach about 16 hours, which can fulfill the detecting needs of one patient. However, the problems by using the rechargeable batteries is that it is necessary to take the rechargeable battery from the host frequently for charging, which brings inconvenience to the apparatus users. Since the volume of the small medical apparatus is usually small, it is not appropriate to directly set the charging plug on the small medical apparatus body.

SUMMARY

The objectives of the present disclosure are to facilitate the charging of small medical apparatus and provide a charging device for the small medical apparatus and a small medical apparatus provided with the charging device.

In order to achieve the objectives described above, in one aspect, the present disclosure provides a charging device for a small medical apparatus, wherein the small medical apparatus includes an apparatus body, a first rechargeable battery and an apparatus charging connector electrically connected to the first rechargeable battery are mounted in the apparatus body; the charging device includes a charging base, a second rechargeable battery is disposed in the charging base, and a charging base charging connector and a charging base discharging connector for electrically connecting the apparatus charging connector are disposed at the charging base; the charging base charging connector is electrically connected to a charging terminal of the second rechargeable battery; and the charging base discharging connector is electrically connected to a discharging terminal of the second rechargeable battery. Because of the above charging device for the small medical apparatus, apparatus users, such as medical staff, do not need to remove the first rechargeable battery from the apparatus body, so that the charging operation is more convenient; it also avoids the use of dry batteries, reduces the small medical apparatus using cost and is more friendly to the environment.

Optionally, the charging base discharging connector is a charging pin protruding outward through a shell of the charging base. In this setting mode, there is no protruding object outside the apparatus body, and no additional setting complex structure is needed, which is more suitable for the portable and mini-sized characteristics of the small medical apparatus.

Optionally, a charging slot is formed by concaving downwardly from an upper surface of the charging base, the charging slot is configured for accommodating the apparatus body. The apparatus body can be matched to be inserted into the charging slot, so that the apparatus body is stable and does not fall off when charging in the charging slot.

Optionally, the charging device further includes a cover, a lower edge of the cover matches with an upper edge of the charging base, to allow the cover to be capable of covering on the charging base; and then a cavity for accommodating the apparatus body is formed by the surrounding of the charging base and the cover. Therefore, a similar box structure can be formed through the cooperation of the cover and the charging base. The apparatus body is accommodated in the middle cavity to better protect the apparatus body. Especially when the apparatus body is transported and carried, the apparatus body can be well fixed and protected through the cooperation of the cover and the charging base to prevent damaging the apparatus body.

Optionally, a shape and a size of the cavity matches with the apparatus body, which reduces the sloshing of the apparatus body in the cavity during transportation and makes the whole device structure more compact.

Optionally, the apparatus body is provided with a display screen and a control key at a side of the apparatus body, and a gap is formed on a side wall of the charging base corresponding to the position of the display screen and the control key. Which allows patients or medical staff to easily operate and control keys and observe relevant data on the display screen through the gap when the apparatus body is charged on the charging base.

Optionally, a charging base communication module and a charging base data transmission connector configured for connecting to the apparatus body are disposed in the charging base, and an input port of the charging base communication module is electrically connected to the charging base data transmission connector. When the apparatus body is placed on the charging base, the charging base data transmission connector can be electrically connected with the corresponding connector of the apparatus body, so as to realize the data transmission of the apparatus body into the charging base while charging.

Optionally, the charging base is further provided with a wireless communication module, the output port of the charging base communication module is electrically connected to the input port of the wireless communication module. The wireless communication module can remotely transmit the data in the charging base to other devices, such as a data cloud and the mobile terminal of doctors or patients and so on.

Optionally, the charging base data transmission connector is a pin protruding outward through a shell of the charging base. In this setting mode, there is no protruding object outside the apparatus body, and no additional setting complex structure is needed, which is more suitable for the portable and mini-sized characteristics of the small medical apparatus.

In another aspect, the present disclosure provides a small medical apparatus, the small medical apparatus includes the charging device for the small medical apparatus according to the present disclosure.

Optionally, a battery capacity of the second rechargeable battery is larger than a battery capacity of the first rechargeable battery. Since the charging device does not belong to the part that requires patients to carry or be used for medical monitoring, the second rechargeable battery can have a larger design volume and thus can have a larger battery capacity.

Optionally, the apparatus body is further provided with a data storage module and an apparatus body communication module is further disposed in the apparatus body, an input port of the apparatus body communication module is electrically connected with an output port of the data storage module; and the apparatus body is further provided with an apparatus data transmission connector for matching the charging base data transmission connector is further disposed on the apparatus body, an output port of the apparatus body communication module is electrically connected with the apparatus data transmission connector.

Optionally, the small medical apparatus is a portable heart rate monitor, a sleep monitor or a ventilator.

Through the technical scheme mentioned above, using the charging device of the present disclosure, when the power of the first rechargeable battery in the apparatus body is insufficient, it is only needed to directly place the apparatus body on the charging base, to make that the apparatus charging connector of the apparatus body matches with the charging base discharging connector of the charging base, so that the first rechargeable battery in the apparatus body can be charged. However, when the second rechargeable battery in the charging base needs to be charged, the charging base charging connector is connected to the municipal power supply or other power supplies, and the current will be transmitted to the second rechargeable battery to complete its charging. Because of the above charging device for the small medical apparatus, apparatus users, such as medical staff, do not need to remove the first rechargeable battery from the apparatus body, so that the charging operation is more convenient; it also avoids the use of dry batteries, reduces the small medical apparatus using cost and is more friendly to the environment.

The above description is merely a summary of the technical solutions of the present disclosure. In order to more clearly know the elements of the present disclosure to enable the implementation according to the contents of the description, and in order to make the above and other purposes, features, and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present disclosure, and a person skilled in the art can obtain other figures according to these figures without paying creative work.

Figure 1:
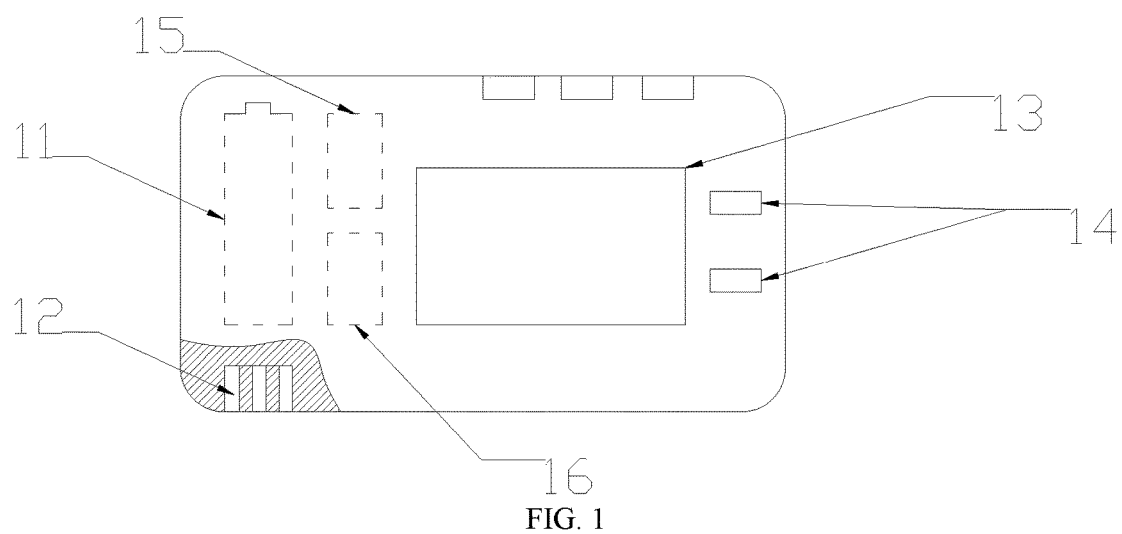
FIG. 1 is a front local sectional view of the apparatus body of a small medical apparatus according to the present disclosure, wherein the dashed line part shows the internal elements of the apparatus body, the sectional view part shows the apparatus charging connector.

Explanations of labels of the attached FIGS.

10 apparatus body, 11 first rechargeable battery, 12 apparatus charging connector, 13 display screen, 14 control key, 15 data storage module, 16 apparatus body communication module, 17 apparatus data transmission connector, 20 charging base. 21 second rechargeable battery, 22 charging base charging connector, 23 charging base discharging connector, 24 charging slot, 25 gap, 26 charging base communication module, 27 wireless communication module; 28 charging base data transmission connector, 30 cover.

DETAILED DESCRIPTION OF THE EMBODIMENTS

In order to make the objects, the technical solutions, and the advantages of the embodiments of the present disclosure clearer, the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

It should also be noted that the specific technical features described in the above specific embodiments may be combined in any appropriate manner without contradiction.

In the present disclosure, it needs to be understood that the orientation or position relationship of the terms 'upper', 'lower' and 'vertical' corresponds to the orientation or position relationship actually used; 'Inside and outside' means the inside and outside of the outline relative of each element itself; it is only for the convenience of describing the present disclosure and simplifying the description, rather than indicating that the device or component referred to must have a specific orientation, be constructed, and operated in a specific orientation, so it cannot be understood as a restriction to the present disclosure. 'Electrical connection' is a connection that can realize charge conduction by a mode such as conducting wire, or a connection that can realize data transmission by a mode such as data line or terminal connection.

The present disclosure will be described in detail referring to the drawings and combining with the embodiments.

According to one aspect of the present disclosure, a charging device for a small medical apparatus is provided, the small medical apparatus includes an apparatus body 10, a first rechargeable battery 11 and an apparatus charging connector 12 electrically connected to the first rechargeable battery 11 are mounted in the apparatus body 10, the charging device includes a charging base 20, a second rechargeable battery 21 is disposed in the charging base 20, and a charging base charging connector 22 and a charging base discharging connector 23 for electrically connecting the apparatus charging connector 12 are disposed at the charging base 20; the charging base charging connector 22 is electrically connected to a charging terminal of the second rechargeable battery 21; and the charging base discharging connector 23 is electrically connected to a discharging terminal of the second rechargeable battery 21.

By using the charging device of the present disclosure, when the power of the first rechargeable battery 11 in the apparatus body 10 is insufficient, it is only needed to directly place the apparatus body 10 on the charging base 20, to make that the apparatus charging connector 12 of the apparatus body 10 matches with the charging base discharging connector 23 of the charging base 20, so that the first rechargeable battery 11 in the apparatus body 10 can be charged.

Specifically, when the apparatus charging connector 12 of the apparatus body matches with the charging base discharging connector 23 of the charging base 20, the power of the second rechargeable battery 21 in the charging base 20 is transmitted to the charging base discharging connector 23 of the charging base 20, and then through the charging base discharging connector 23 is transmitted to the matching apparatus charging connector 12, and finally is transmitted to the first rechargeable battery 11 electrically connected to the apparatus charging connector 12, to complete the charging of the apparatus body 10.

when the second rechargeable battery 21 in the charging base 20 needs to be charged, the charging base charging connector 22 is connected to the municipal power supply or other power supplies, and the current will be transmitted to the second rechargeable battery 21 to complete its charging.

Because of the above charging device for the small medical apparatus, apparatus users such as medical staffs do not need to remove the first rechargeable battery 11 from the apparatus body 10, so that the charging operation is more convenient; the use of dry batteries is avoided therefore the usage cost of the small medical apparatus is reduced. In addition, it is more friendly to the environment.

Figure 2:
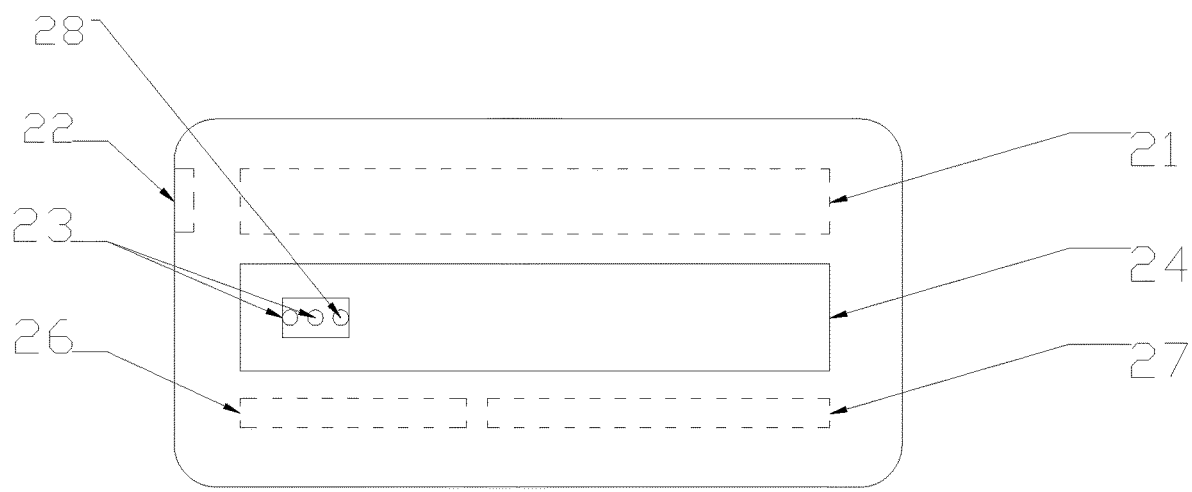
FIG. 2 is a top view of a charging base of the charging device for the small medical apparatus according to the present disclosure, wherein the dashed line part shows the internal elements of the charging base, the charging base is compatible with the apparatus body in FIG. 1.
Figure 5:
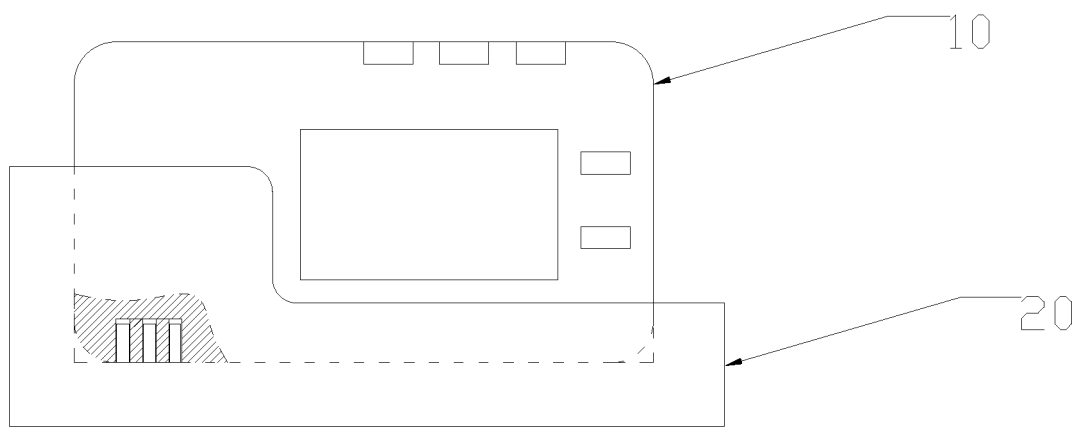
FIG. 5 is a front view when the apparatus body in FIG. 1 is placed in the charging base in FIG. 2.
Figure 6:
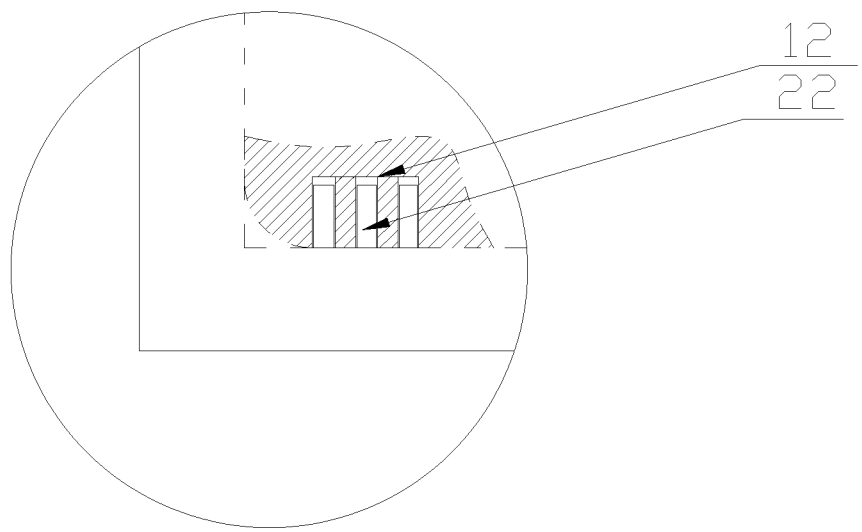
FIG. 6 is an enlarged drawing of the circle part in FIG. 5.

Referring to FIG. 1, FIG. 2, FIG. 5 and FIG. 6, the charging base discharging connector 23 is a charging pin protruding outward through the shell of the charging base 20, such as may be a PIN needle, the apparatus charging connector 12 is formed as a charging interface form from the surface of the apparatus body 10 into the concave. In this setting mode, there is no protruding object outside the apparatus body 10, and no additional setting complex structure is needed, which is more suitable for the portable and mini-sized characteristics of the small medical apparatus. Moreover, in order to facilitate the operation of inserting the charging pin into the charging interface, the charging pin can be set to protruding vertically from an upper surface of the charging base 20.

Optionally, a charging slot 24 is formed by concaving downwardly from an upper surface of the charging base 20, the charging slot 24 is configured for accommodating the apparatus body 10. The apparatus body 10 can be matched to be inserted into the charging slot 24, so that the apparatus body 10 is stable and does not fall off when charging in the charging slot 24.

Further, the charging device further includes a cover 30, a lower edge of the cover 30 matches with an upper edge of the charging base 20, to make the cover 30 to be capable of covering on the charging base 20; and a cavity for accommodating the apparatus body 10 is formed by the surrounding of the charging base 20 and the cover 30. Therefore, a similar box structure can be formed through the cooperation of the cover 30 and the charging base 20. The apparatus body 10 is accommodated in the middle cavity to better protect the apparatus body 10. Especially when the apparatus body 10 is transported and carried, the apparatus body 10 can be fixed well and protected through the cooperation of the cover 30 and the charging base 20 to prevent damaging the apparatus body 10. Optionally, a shape and a size of the cavity matches with the apparatus body 10, which reduces the sloshing of the apparatus body 10 in the cavity during transportation and makes the whole device structure more compact.

Figure 3:
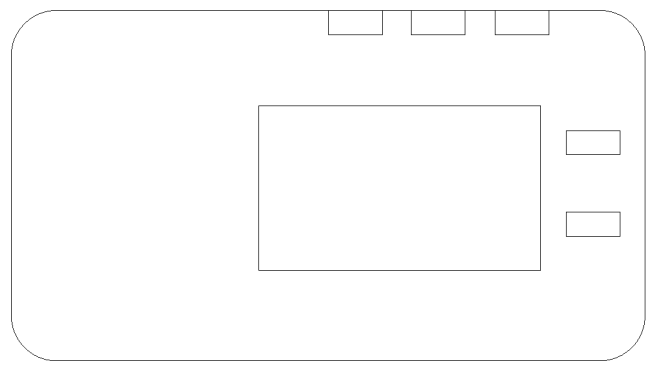
FIG. 3 is a front view of the apparatus body in FIG. 1.
Figure 4:
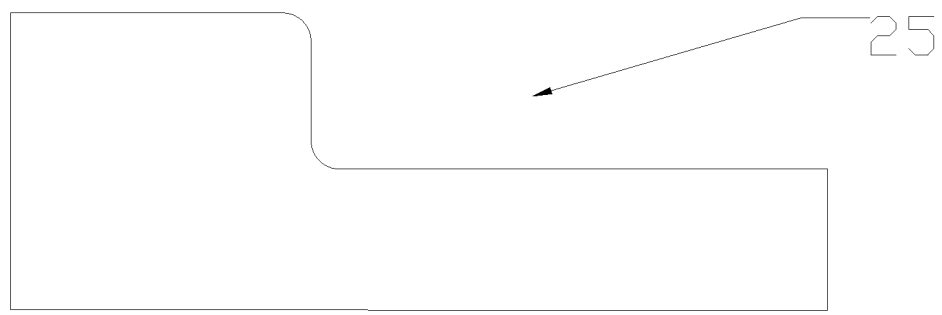
FIG. 4 is a front view of the charging base in FIG. 2.
Figure 7:
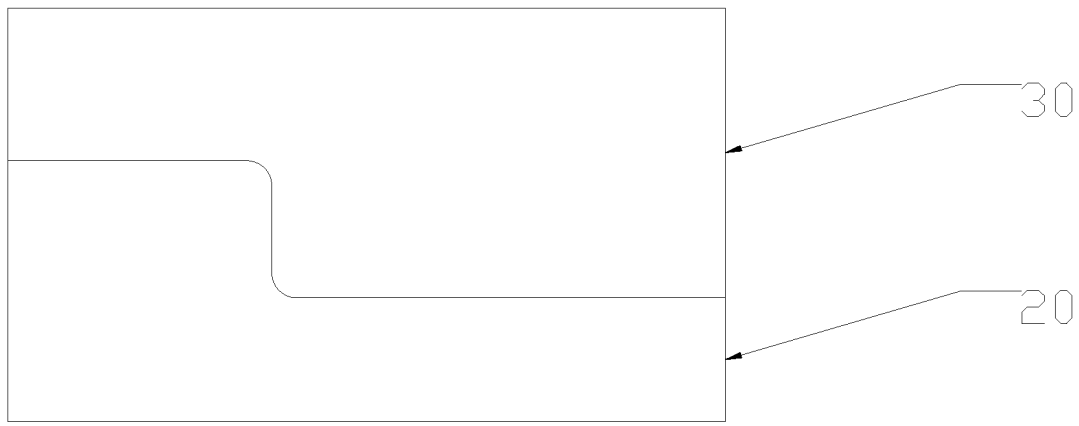
FIG. 7 is a front view when the charging base is covered by the matched cover.
Figure 8:
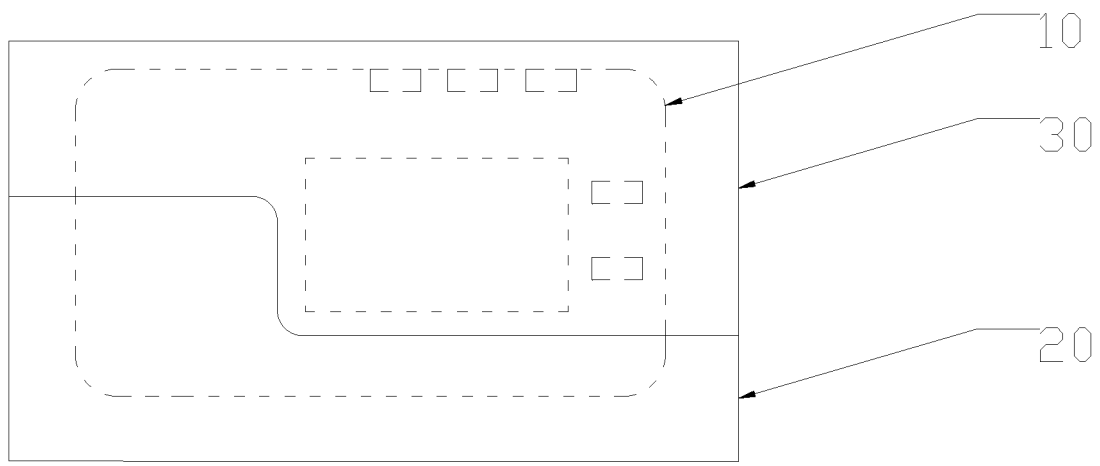
FIG. 8 is a front view showing the mall medical apparatus of the present disclosure, and showing the apparatus body is accommodated in the charging device.

Referring to FIG. 3 to FIG. 5, FIG. 7 and FIG. 8, the apparatus body 10 is provided with a display screen 13 and a control key 14 on a side, and a gap 25 is formed on a side wall of the charging base 20 corresponding to the position of the display screen 13 and the control key 14, which allows the patients or medical staff to easily operate and control keys 14 and observe relevant data on the display screen 13 through the gap 25 when the apparatus body 10 is charged on the charging base 20, wherein, the design of the position, specific size and shape of the gap 25 and so on can be adaptive adjusted corresponding to the display screen 13 and the control key 14.

In addition, for the existing small medical apparatus, data transmission methods usually include three kinds, namely memory card, data line and Bluetooth. The storage card is installed on the apparatus body to store the test data, which needs to be removed from the apparatus body and inserted into a reader to read the data. The method of data line is to connect the apparatus body directly to the computer through the data line for data reading. For the method of Bluetooth, Bluetooth requires doctors to operate computers, to perform Bluetooth pairing computers with small medical apparatuses, and then open a dedicated app software for data transmission. The above three methods need medical staff to do some operation to complete data transmission. Especially, when the doctor is far away from the small medical apparatus, the form of storage card and data line transmission is not so convenient, and the Bluetooth pairing for data transmission is to be completed which requires medical staff to have higher computer operation skills and needs to perform special software training for medical staff Therefore, the inventor of the present disclosure further performs the following design: optionally, a charging base communication module 26 and a charging base data transmission connector 28 configured for connecting to the apparatus body 10 are disposed in the charging base 20, and an input port of the charging base communication module 26 is electrically connected to the charging base data transmission connector 28. The charging base data transmission connector 28 can receive the monitoring data in the apparatus body 10 and store them in the charging base communication module 26 of the charging base 20. When the apparatus body 10 is placed on the charging base 20, the charging base data transmission connector 28 can be electrically connected with the corresponding connector of the apparatus body 10, so as to realize the data transmission of the apparatus body 10 into the charging base 20 while charging. For the small medical apparatus, during usage, it is necessary to collect the data of patients in real time. The amount of data is relatively large, and the volume and storage space of the small medical apparatus are limited. The present disclosure can export the data when charging, which not only does not delay the time of patient monitoring or treatment, but also meets the needs of small medical apparatus. Further optionally, a wireless communication module 27 is further disposed in the charging base 20, the output port of the charging base communication module 26 is electrically connected with the input port of the wireless communication module 27. The wireless communication module 27 can remotely transmit the data in the charging base 20 to other devices, such as a data cloud and the mobile terminal of doctors or patients and so on.

Correspondingly, as an optional embodiment, a data storage module 15 and an apparatus body communication module 16 is further disposed in the apparatus body 10, an input port of the apparatus body communication module 16 is electrically connected with an output port of the data storage modulel 5; and an apparatus data transmission connector 17 for matching the charging base data transmission connector 28 is further disposed on the apparatus body 10, an output port of the apparatus body communication module 16 is electrically connected with the apparatus data transmission connector 17.

By using charging device of the present disclosure, when the data in the apparatus body 10 is needed to be transmitted, only the apparatus body 10 is placed directly on the charging base 20, so that the apparatus data transmission connector 17 of the apparatus body 10 matches with the charging base data transmission connector 28 of the charging base 20, the data transmission in the apparatus body 10 can be transmitted to the wireless communication module 27, and then the data is transmitted to the cloud or other designated addresses through the wireless communication module 27, so that the doctor can obtain the patient's test data more conveniently.

Specifically, when the apparatus data transmission connector 17 of the apparatus body 10 matches with the charging base data transmission connector 28 of the charging base 20, the data in the data storage module 15 is transmitted to the wireless communication module 27 in turn through the apparatus body communication module 16, the apparatus data transmission connector 17, the charging base data transmission connector 28 and the charging base communication module 26, and finally the data is transmitted to the cloud or other specified addresses through the wireless communication module 27. Because of the above charging device for the small medical apparatus, when the first rechargeable battery 11 in the apparatus body 10 is charged, at the same time, the transmission of patient test data can be completed without the intervention of doctor. The data transmitted to the cloud or other designated address makes it more convenient for doctors to obtain the data of the patient, which reduces labor intensity, saves time and improves convenience. Moreover, since the wireless communication module 27 with large power consumption is installed in the charging base 20, it does not need to occupy the space of the apparatus body 10, nor need to improve the battery capacity of the first rechargeable battery 11, so it is more suitable for the portable and mini-sized characteristics of the small medical apparatus.

Referring to FIG. 1, FIG. 2, FIG. 5 and FIG. 6, the charging base data transmission connector 28 is a pin protruding outward through the shell of the charging base 20, such as may be a PIN needle, the apparatus data transmission connector 17 is formed as a data transmission interface form from the surface of the small medical apparatus into the concave. In this setting mode, there is no protruding object outside the apparatus body 10, and no additional setting complex structure is needed, which is more suitable for the portable and mini-sized characteristics of the small medical apparatus. Moreover, in order to facilitate the operation of inserting the pin into the charging interface, the pin can be set to protruding vertically from an upper surface of the charging base 20.

In another aspect, the present disclosure provides a small medical apparatus, the small medical apparatus includes the charging device for the small medical apparatus according to the present disclosure.

In general case, a battery capacity of the second rechargeable battery 21 is larger than a battery capacity of the first rechargeable battery 11. Since the charging device does not belong to the part that requires patients to carry or be used for medical monitoring, the second rechargeable battery 21 can have a larger design volume and thus can have a larger battery capacity. Usually, the second rechargeable battery 21 can be maintained in an in state of charge to facilitate the apparatus body 10 to be charged.

And especially, the small medical apparatus is a portable heart rate monitor or a sleep monitor, such as a mini-mental monitor, a sleep monitor or a ventilator wearable on patients' arms.

The preferred embodiment of the present disclosure is described in detail above in combination with the attached drawings. However, the present disclosure is not limited to this. Within the scope of the technical idea of the present disclosure, a plurality of simple variations the technical solutions of the present disclosure can be carried out, including any combination of specific technical features in any appropriate manner. In order to avoid unnecessary duplication, the present disclosure no longer explains any possible combinations. However, these simple variants and combinations should also be regarded as the content disclosed in the present disclosure, which belongs to the protection scope of the present disclosure.

The device embodiments described above is only schematic, the units illustrated as separated parts may be or may not be separated physically, and the parts shown in unit may be or may not be a physical unit. That is, the parts may be located at one place or distributed in multiple network units. A skilled person in the art may select part or all modules therein to realize the objective of achieving the technical solution of the embodiment. Those of ordinary skill in the art can understand and implement it without creative effort.

The term "one embodiment", "an embodiment", or "one or more embodiments" herein means that the particular features, structures, or features described in combination with embodiments are included in at least one embodiment disclosed herein. Also, note that the examples of words "in an embodiment" here do not necessarily all refer to the same embodiment.

A great deal of detail is provided in the manual provided here. However, it is understood that this disclosed embodiment can be practiced without such specific details. In some instances, known methods, structures and techniques are not detailed so as not to obscure the understanding of this specification.

In a claim, no reference symbol between parentheses shall be constructed to restrict the claim. The word "include" does not exclude the existence of elements or steps not listed in the claim. The word "one" or "one" before a component does not preclude the existence of more than one such component. This exposure can be implemented with the help of hardware including several different components and with the help of properly programmed computers. In listing the unit claims of several devices, several of these devices can be embodied by the same hardware item. The use of the words first, second, and third does not indicate any order. These words can be interpreted as names.

Finally, it should be noted that the above embodiments are only used to illustrate, and not to limit, the disclosed technical solution; notwithstanding the detailed description of the present disclosure with reference to the foregoing embodiments, ordinary technical personnel in the field should understand that they can still modify the technical solutions recorded in the foregoing embodiments, or make equivalent substitutions to some of the technical features thereof; such modifications or substitutions shall not separate the essence of the corresponding technical solutions from the spirit and scope of the technical solutions of the disclosed embodiments.

What is claimed is:

1. A charging device for a small medical apparatus, wherein
    the small medical apparatus comprises an apparatus body, wherein a first rechargeable battery and an apparatus charging connector electrically connected to the first rechargeable battery are mounted in the apparatus body,
    the charging device comprises a charging base, wherein a second rechargeable battery is disposed in the charging base, and a charging base charging connector and a charging base discharging connector for electrically connecting the apparatus charging connector are disposed at the charging base;
    the charging base charging connector is electrically connected to a charging terminal of the second rechargeable battery; and
    the charging base discharging connector is electrically connected to a discharging terminal of the second rechargeable battery;
    wherein, a charging base communication module and a charging base data transmission connector configured for connecting to the apparatus body are disposed in the charging base, and
    an input port of the charging base communication module is electrically connected to the charging base data transmission connector.

2. The charging device according to claim 1, wherein, the charging base discharging connector is a charging pin protruding outward through a shell of the charging base.

3. The charging device according to claim 1, wherein, a charging slot is formed by concaving downwardly from an upper surface of the charging base, and the charging slot is configured for accommodating the apparatus body.

4. The charging device according to claim 3, wherein,
    the charging device further comprises a cover, wherein a lower edge of the cover matches with an upper edge of the charging base, to allow the cover to cover the charging base, and
    a cavity for accommodating the apparatus body is formed by a surrounding of the charging base and the cover.

5. The charging device according to claim 4, wherein a shape and a size of the cavity matches with a shape and a size of the apparatus body.

6. The charging device according to claim 3, wherein,
    the apparatus body is provided with a display screen and a control key at a side of the apparatus body, and
    a gap is formed on a side wall of the charging base corresponding to a position of the display screen and the control key.

7. The charging device according to claim 1, wherein the charging base is further provided with a wireless communication module, and an output port of the charging base communication module is electrically connected to an input port of the wireless communication module.

8. The charging device according to claim 1, wherein, the charging base data transmission connector is a pin protruding outward through a shell of the charging base.

9. A small medical apparatus comprising an apparatus body and a charging device, wherein a first rechargeable battery and an apparatus charging connector electrically connected to the first rechargeable battery are mounted in the apparatus body,
    the charging device comprises a charging base, wherein a second rechargeable battery is disposed in the charging base, and a charging base charging connector and a charging base discharging connector for electrically connecting the apparatus charging connector are disposed at the charging base;
    the charging base charging connector is electrically connected to a charging terminal of the second rechargeable battery; and
    the charging base discharging connector is electrically connected to a discharging terminal of the second rechargeable battery;
    wherein, a charging base communication module and a charging base data transmission connector configured for connecting to the apparatus body are disposed in the charging base, and
    an input port of the charging base communication module is electrically connected to the charging base data transmission connector.

10. The small medical apparatus according to claim 9, wherein, a battery capacity of the second rechargeable battery is larger than a battery capacity of the first rechargeable battery.

11. The small medical apparatus according to claim 9, wherein,
    the apparatus body is further provided with a data storage module and an apparatus body communication module, wherein an input port of the apparatus body communication module is electrically connected with an output port of the data storage module; and
    the apparatus body is further provided with an apparatus data transmission connector for matching a charging base data transmission connector, wherein an output port of the apparatus body communication module is electrically connected with the apparatus data transmission connector.

12. The small medical apparatus according to claim 9, wherein, the small medical apparatus is a portable heart rate monitor, a sleep monitor or a ventilator.

13. The small medical apparatus according to claim 9, wherein, the charging base discharging connector is a charging pin protruding outward through a shell of the charging base.

14. The small medical apparatus according to claim 9, wherein, a charging slot is formed by concaving downwardly from an upper surface of the charging base, and the charging slot is configured for accommodating the apparatus body.

15. The small medical apparatus according to claim 14, wherein,
    the charging device further comprises a cover, a lower edge of the cover matches with an upper edge of the charging base, to allow the cover to cover the charging base, and
    a cavity for accommodating the apparatus body is formed by a surrounding of the charging base and the cover.

16. The small medical apparatus according to claim 15, wherein, a shape and a size of the cavity matches with a shape and a size of the apparatus body.

17. The small medical apparatus according to claim 14, wherein,
- the apparatus body is provided with a display screen and a control key at a side of the apparatus body, and
- a gap is formed on a side wall of the charging base corresponding to a position of the display screen and the control key.

18. The small medical apparatus according to claim 9, wherein,
- the charging base is further provided with a wireless communication module, and
- an output port of the charging base communication module is electrically connected to an input port of the wireless communication module.

\* \* \* \* \*